United States Patent [19]

Lampe et al.

[11] 3,908,182

[45] Sept. 23, 1975

[54] NON-VOLATILE MEMORY CELL

[75] Inventors: Donald R. Lampe, Ellicott City; Marvin H. White, Laurel; Franklyn C. Blaha, Glen Burnie, all of Md.

[73] Assignee: Westinghouse Electric Corporation, Pittsburgh, Pa.

[22] Filed: May 8, 1974

[21] Appl. No.: 468,339

[52] U.S. Cl. .............. 357/24; 307/221 D; 307/238; 307/304; 340/173 R; 357/41; 357/54; 357/59

[51] Int. Cl.[2] .................... H01L 29/78; G11C 11/40

[58] Field of Search ................... 357/23, 24, 41, 54; 307/221 D, 304; 340/173 R, 173 CA

[56] References Cited

UNITED STATES PATENTS

| | | | |
|---|---|---|---|
| 3,654,499 | 4/1972 | Smith | 357/24 |
| 3,728,695 | 4/1973 | Frohman-Bentchkowsky | 357/41 |

OTHER PUBLICATIONS

White et al., "CCD and MNOS Devices . . . " IEEE IEDM Technical Digest, Int. Electron Devices Meeting, Dec. 1973, pp. 130–133.

*Primary Examiner*—William D. Larkins
*Attorney, Agent, or Firm*—J. B. Hinson

[57] ABSTRACT

A memory cell combining CCD and MNOS technology comprised of a MNOS transistor having a reversible, electrically shiftable threshold wherein its memory-controlled gated source is connected in series with a MOSFET address switch transistor, with the address switch transistor and MNOS memory transistor being coupled in parallel with a CCD shift register stage by means of respective P+ diffused regions within separate wells of the CCD shift register. Preferably, each CCD shift register stage includes two receiving potential wells capable of holding minority carriers defined by two regions acting as barriers to the flow of minority carriers and having a multi-phase drive system operating the shift register. The non-volatile memory thus configured provides non-volatile storage outside the CCD shift register, in which the CCD signal charge controls the (memory write) address switch; and memory read-out is accomplished by parallel data charge injection via the memory-controlled gated source, with no logic inversion.

12 Claims, 4 Drawing Figures

NON-VOLATILE MEMORY CELL

BACKGROUND OF THE INVENTION

1. Field of the Invention

This invention relates generally to semiconductor memory elements and more particularly to a non-volatile memory element combining the technology of charge coupled devices (CCD) and MNOS devices.

2. Description of the Prior Art

The use of metal nitride oxide semiconductor (MNOS) transistors in non-volatile memory cells is well known to those skilled in the art, being taught for example in U.S. Pat. No. 3,651,492, issued to George C. Lockwood. Such devices constitute standard insulated gate field effect transistors in which the silicon dioxide gate insulator is replaced by a double insulator, typically a layer of silicon dioxide nearest the silicon substrate and a layer of silicon nitride over the silicon dioxide. Memory is obtained in MNOS elements by electrically reversible tunnelling of charge from the silicon to "traps" of electrical charge at the silicon dioxide-silicon nitride interface. The threshold voltage or the voltage applied to the gate which initiates current flow between the drain and source electrodes is influenced by the charge state of the traps. These traps are conventionally charged and discharged by the application of a sufficiently large polarizing voltage of predetermined polarity coupled across the gate electrode and substrate. Information is read out of the device by way of the source and drain electrode.

In an MNOS memory device having for example an n-type substrate and a p-type source and drain regions, application of a relatively large positive polarizing potential applied to the gate when the substrate is grounded would charge the traps negatively and cause a permanent p-type channel to exist between the drain and source electrodes and thereby establish a first or low threshold state. This state is defined as the binary "1" state as well as the CLEAR or ERASE state. Reversal of the polarity of the polarizing potential, i.e. applying a large negative potential to the gate, will charge the traps positively forming an n-type channel between the source and drain and establishing a second or a high threshold state defined as the binary "0" state. Thereafter current can be made to flow or remain cut off between the source and drain by the reapplication of a suitable lower potential applied to the gate. The state of the memory element therefore may be read by either of two means, voltage sensing or current sensing.

More recently, a new type of semiconductor device called the charge coupled device or simply CCD has appeared on the scene for storing and sequentially transferring electronic signals. These devices have been described by W. S. Boyle and G. S. Smith in an article entitled "Charge Coupled Semiconductor Devices," which appeared in the Bell System Technical Journal, Apr., 1970, at pages 587–593, inclusive. In such devices, charges are stored in potential wells created at the surface of a semiconductor and voltages are employed to move the charges along this surface. More particularly, these charges constitute minority carriers stored at the silicon-silicon dioxide interfaces of MOS capacitors and are transferred from capacitor to capacitor on the same substrate by manipulating the voltages applied across the capacitor. Charge coupled devices configured as memory devices, moreover, have been disclosed for example in U.S. Pat. No. 3,654,499, Smith, as well as the publication entitled "Charge-Coupled Memory Device," Y. T. Chan, et al. Appl. Phys. Lett., Vol. 22, No. 12, 15 June, 1973, pp. 650. The latter teaching discloses a non-volatile storage inside of a CCD shift register.

SUMMARY

The present invention is directed to a non-volatile memory element outside of a CCD shift register and comprises a MNOS transistor device utilized as the memory element whose source is series connected with a MOSFET address switch transistor controlled by the signal carriers in one potential well of a multi-bit CCD shift register stage, while the drain of the MNOS memory transistor is coupled to another well of the same CCD shift register stage. The shift register stage preferably includes four potential energy regions, two of which are utilized as barriers between two other separated receiving regions (wells) which in turn are respectively coupled to the gate of the address switch transistor and the drain of the MNOS memory transistor by means of P+ diffusions within the receiving wells. By selectively applying suitable bias potentials to the address switch transistor and the MNOS memory transistor following the application of input data into the CCD shift register stage, the binary 0 or 1 state appearing at the well coupled to the address switch transistor is adapted to control the threshold voltage of the MNOS transistor; and thus non-destructively effect a binary type of charge injection back into the well coupled to the memory transistor on read-out of the memory cell.

DESCRIPTION OF THE PREFERRED EMBODIMENTS

Figure 1:
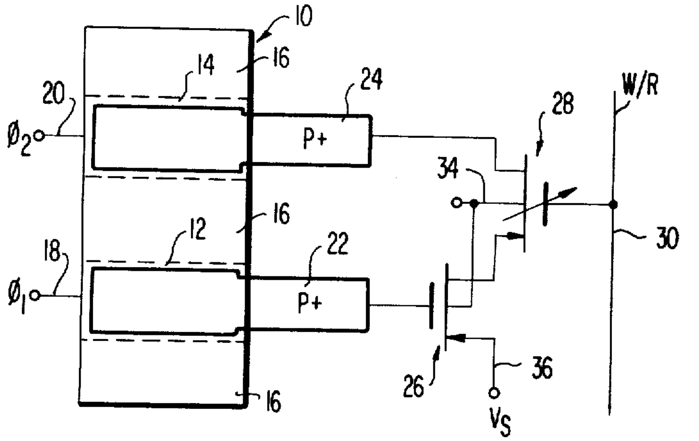
FIG. 1 is a schematic diagram of a first embodiment of the subject invention controlled by two-phase CCD shift register drive signals.

Referring now to the drawings, and more particularly to FIG. 1, wherein there is disclosed the first embodiment of the subject invention, reference numeral 10 denotes one stage of a two phase charge coupled device (CCD) shift register including two potential wells 12 and 14 which are shown diagrammatically for sake of simplicity but which in reality comprises for example a stepped oxide configuration well known in the art. A barrier region 16 is also formed on either side of the wells 12 and 14 either by means of the stepped oxide or by means of an ion implantation in order to prevent charge from spilling over into adjacent bit locations. A two phase transfer clock system including the signals $\phi_1$ and $\phi_2$ are respectively applied thereto by means of CCD electrodes 18 and 20 from a source, not shown, for selectively shifting charge from one shift register bit to another within or at each of the wells 12 and 14 is a respective P+ diffused sense region 22 and 24. The sense regions 22 and 24 "sense" the surface potential in the respective well and respectively couple to an MOS field effect transistor 26 which is adapted to operate as an address switch and a MNOS transistor 28 which is adapted to act as the memory element for the subject memory cell.

The memory cell shown in FIG. 1 combines the technology of CCD devices and MNOS devices in that the components shown in FIG. 1 are fabricated on a common semiconductor chip. As noted above the MOSFET transistor 26 operates as an address switch for the MNOS memory element 28 and has its drain electrode directly connected to the source of the memory transistor 28. The switch transistor 26 and the memory transistor 28 in effect are series connected in parallel to the two wells 12 and 14 by the respective sense regions 22 and 24 in that the gate of the switch transistor 26 is coupled to the sense region 22 while the drain of memory transistor 28 is coupled to the sense region 24. The gate of the MNOS memory transistor comprises a memory window, which is coupled to a WRITE/READ conductor line 30. The substrate of both transistors 26 and 28 are adapted to be coupled to selective bias potentials applied thereto by means of electrical circuit node 34. Additionally, the source electrode for the address switch transistor 26 is adapted to be coupled to a bias potential $V_s$ applied to electrical circuit node 36.

Since the operation of the memory cell shown in FIG. 1 is essentially the same as that for the preferred embodiment shown in FIG. 2, reference to FIGS. 2 and 3 will be given and the operation thereof considered, noting the difference between the two embodiments. Whereas the memory cell shown in FIG. 1 utilized a two phase shift register stage, the preferred embodiment utilizes a four phase shift register stage 40. The stage 40 includes four potential wells 42, 44, 46 and 48, having respective clock signals $\phi_1$, $\phi_2$, $\phi_3$ and $\phi_4$ applied to electrodes 50, 52, 54 and 56 respectively connected to conductor lines 51, 53, 55 and 57 (FIG. 4). Whereas the two phase embodiment included sensing diffusions under adjacent electrodes, the embodiment shown in FIG. 2 includes P+ diffused sense regions 58 and 60 under alternately located electrodes, 50 and 54, with the regions 44 and 48 acting as barriers to the flow of minority carriers. As in the first embodiment, the sense region 58 couples to the gate of a MOSFET address switch transistor 62 while the sense region 60 couples to the drain of a MNOS memory transistor 64. Structurally, the monolithic configuration of the memory cell shown in FIG. 2 is disclosed for sake of illustration in FIG. 3.

Figures 2, 4:
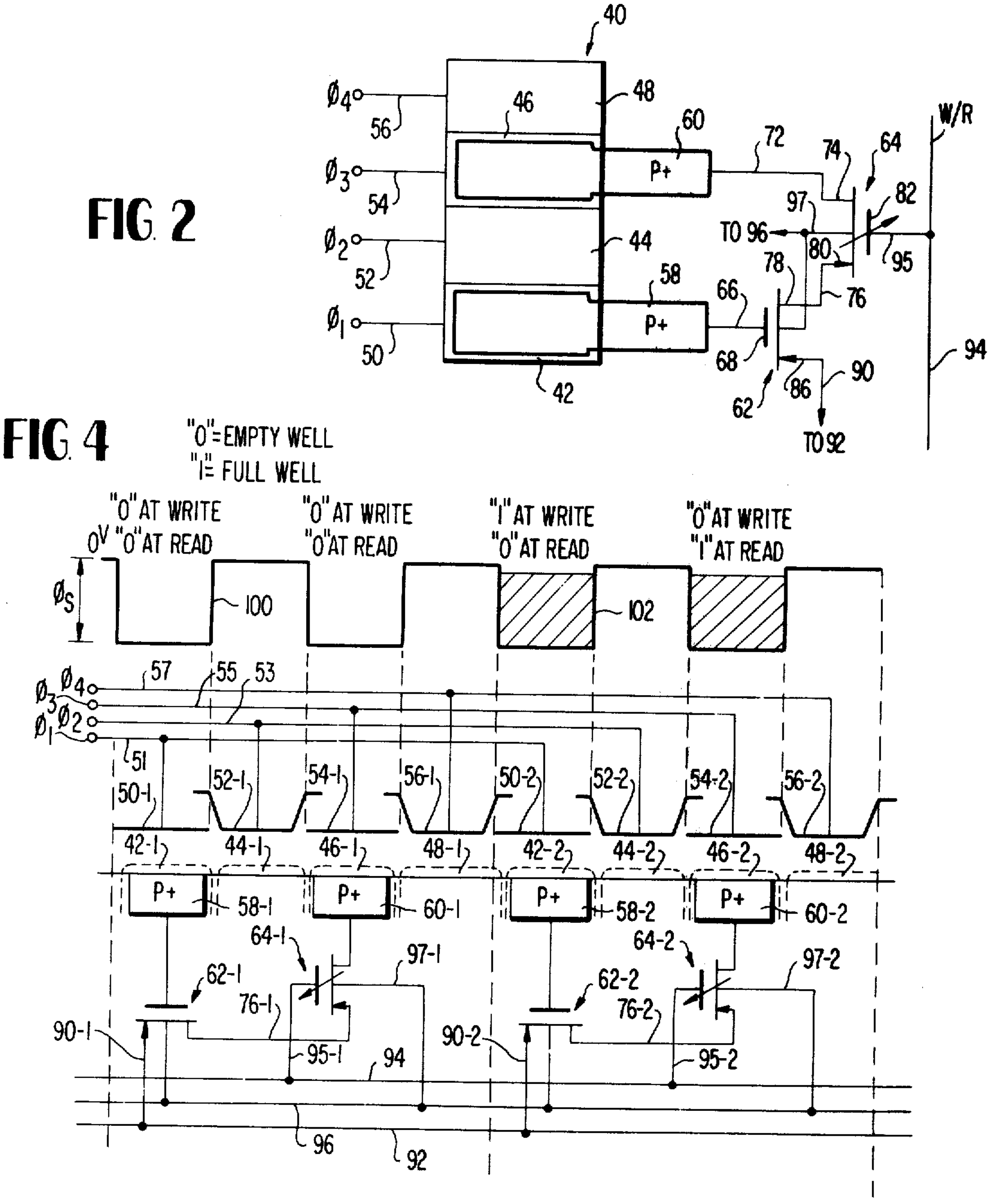
FIG. 2 is a schematic diagram illustrative of a second and preferred embodiment of the subject invention including a four phase drive for the CCD shift register.
FIG. 4 is a diagram illustrative of two consecutive memory cells, one of which involves reading in a 0 state while the other involves reading in a 1 state into the respective cells.
Figure 3:
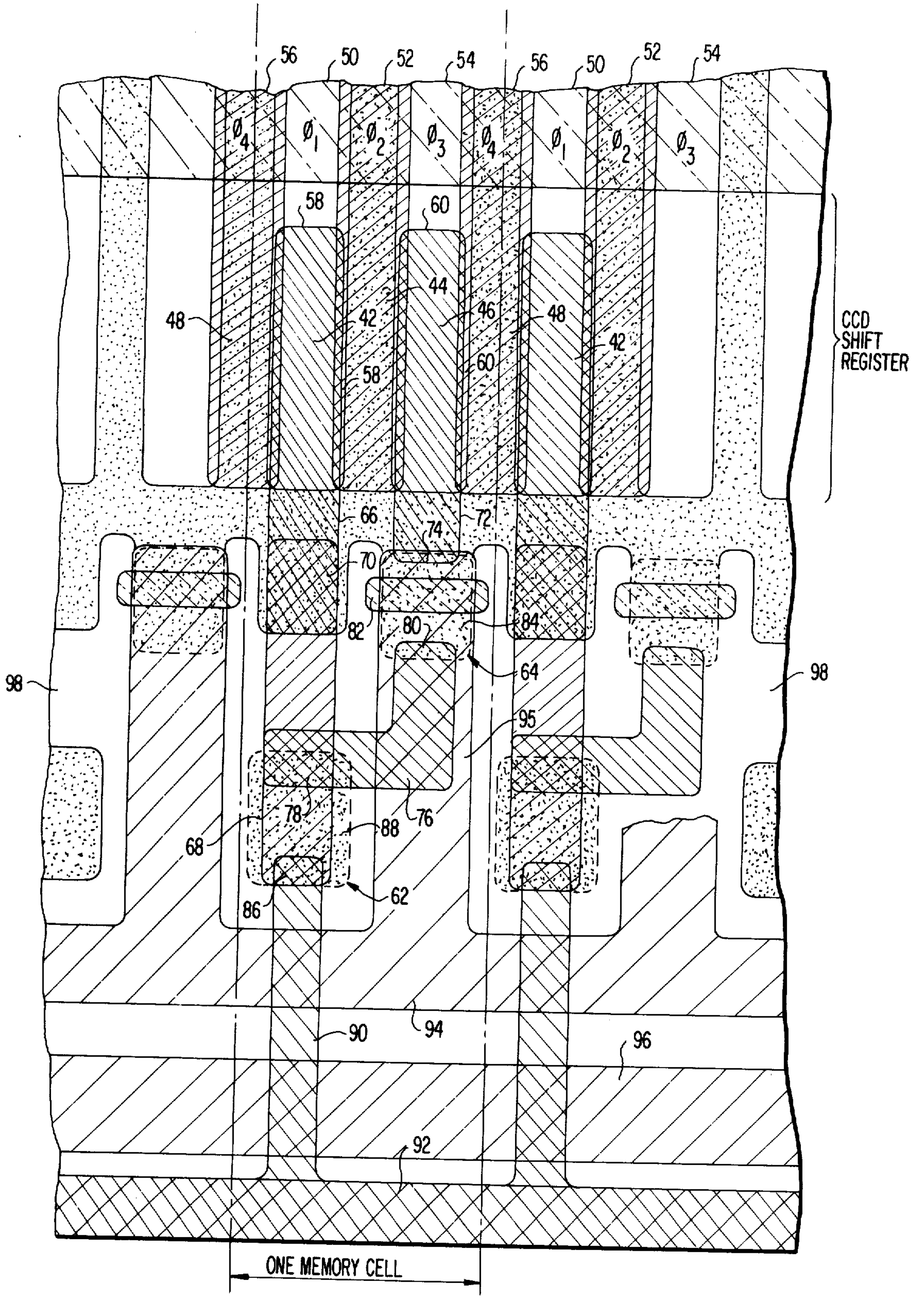
FIG. 3 is a fragmented plan view illustrative of a photomicrograph of a semiconductor chip incorporating the cell shown schematically in FIG. 2.

Referring now more particularly to FIG. 3, each memory cell of a linear array is shown consisting of the four distinct surface potential regions 42, 44, 46 and 48 adjacent one another, being configured in parallel strip-like fashion as shown. The P+ diffusion sensing regions 58 and 60 lie at/within the wells 42 and 46 in the same lengthwise fashion. A strip-like electrical circuit node 66 extends the diffusion 58 toward the address switch transistor 62 and joins the address switch gate 68 at the region 70. Likewise, a circuit node 72 extends the diffusion region 60 to the memory transistor 64 at the region 74. An angulated P+ diffusion region 76 constitutes a circuit node joining the drain region 78 of the switch transistor 62 to the source region 80 of the memory transistor 64. The memory window or gate region 82 is shown traversing the region 84 defining the memory transistor 64 intermediate the drain and source regions 74 and 80. The source of the address switch 62 constitutes the region 86 of the region 88 which is a void in the polysilicon field shield 98 defining the switch transistor 62. The source region 86 connects to a circuit node 90 which joins to a conductor line 92 of metallization for the application of a suitable bias potential to the source of the address transistor 62. A READ/WRITE gate consisting of an aluminization pattern conductor line 94 traverses the angulated diffusion region 76 to make contact with the memory window 82 by means of a circuit node 95. Additionally, a conductor line 96 situated between the conductor lines 92 and 94 is adapted to provide a substrate contact for both the substrate of the memory transistor 64 and the address switch transistor 62 by being coupled to the node 97 (FIG. 2) as well as providing a potential contact for the field shield region 98 shown in FIG. 3.

Turning attention now to the operation of the memory cell shown in FIGS. 2 and 3, reference will now be made to FIG. 4, wherein two adjacent memory cells are shown. The operational sequence to write data into any memory cell consists of five sequential steps. The first step entails selecting or "addressing" the memory cell by applying power to the semiconductor chip including the memory cell. Next, the memory cell is cleared of any preexisting binary 0 data state by setting the threshold state of the memory transistors 64-1 and 64-2 to a low $V_{TH} \cong -2$v. state. This is accomplished by grounding the WRITE/READ conductor line 94 and thereby coupling ground potential via circuit nodes 95-1 and 95-2 to the gates and memory windows of memory transistors 64-1 and 64-2. At the same time that the READ/WRITE conductor line 94 is grounded, the substrates of the memory transistors 64-1 and 64-2 are pulsed by means of a negative voltage $-V_P$ assuming an n-type substrate, by applying the pulse $-V_P$ to the conductor line 96 which couples to nodes 97-1 and 97-2. This operation sets the threshold of the memory transistors 64-1 and 64-2 to its low or 1 state. The third step consists in entering the data into the respective CCD register stages 40-1 and 40-2 by clocking the signals $\phi_1$, $\phi_2$, $\phi_3$ and $\phi_4$ in a well known manner with the desired binary number state to be memorized held in the wells 42-1 and 42-2, respectively. The WRITE step next consists in applying a negative pulse $-V_P$ to the WRITE/-READ conductor line 94 while the source and the substrate conductor lines 92 and 96, respectively, are grounded. Additionally, the four phase drive signals $\phi_1$, $\phi_2$, $\phi_3$ and $\phi_4$ are applied such that $\phi_1$ and $\phi_3$ are low so that the well 42-1 and 42-2 holds the data put into the CCD register while $\phi_2$ and $\phi_4$ are high potentials which create potential barriers for example between the wells 42-1 and 46-1. Now, for example, if the surface potential $\phi_S$ at the well 42-1 corresponds to a binary 0 state, where by definition a relatively small charge or no charge exists in the well as sensed by the sensing region 58-1, a condition exists such that $|\phi_S| \geqq |V_S| + |V_{TH}|$ where $V_S$ is the source potential, with $V_S = 0$ for a grounded source and $V_{TH}$ is the threshold voltage of the switch transistor 62-1. The switch transistor conducts causing the full field to be applied across the MNOS memory transistor 64-1, at which time the threshold of the memory transistor 64-1 goes from its low (approx. −2v.) threshold value, corresponding to a binary 1 state, to its relatively high threshold (approx. −10v.) indicative of a binary 0 state.

The surface potential $\phi_S$ under the four wells 42-1 . . . 48-1 for writing a binary 0 state into the first memory cell is depicted by the waveform 100 shown in FIG. 4. The accompanying tabulation is indicative of the well state both during the WRITE and READ modes.

Considering now the second memory cell for the purposes of illustrating the writing of a binary 1 into the memory cell, the surface potential waveform 102 indicates the condition where the first well 42-2 of the second shift register stage is relatively filled with charge such that $\phi_S$ denotes a binary 1 state. Accordingly, $|\phi_S|<|V_S|+|V_{TH}|$ in which instance the switch transistor 62-2 remains non-conductive and the source of the memory transistor 64-2 floats so that no tunnelling can occur in the thin memory oxide layer. The threshold voltage $V_{TH}$ of the memory transistor 64-2 does not shift from its low threshold value and thus the memory remains in its CLEAR state, i.e., the binary 1 state. This condition is often referred to as the "write inhibit" mode. Finally, a chip deselect operation takes place wherein power is turned off from the memory cell until it is again selected or addressed.

Considering now the READ mode of operation, it also consists of a sequence of operations performed as follows. First the chip is again selected or addressed by applying power to the chip. The $\phi_1$ and $\phi_3$ drive signals are again made low while the $\phi_2$ and $\phi_4$ are made to be high. In actuality, a "low" electrode potential means "attractive" to (CCD) signal charges while "high" electrode potential means "repulsive" to (CCD) signal charges. Next, a $-V_R$ pulse approximately equal to the high threshold $V_{TH}$ of the memory transistor, i.e., $\approx -10$ volts, is applied to the WRITE/READ conductor line 94 while the source, line 92, and the substrate conductor line 96 are made to be at ground potential (i.e., $V_S = 0$). As such, a condition exists where the lower threshold voltage of the memory transistor 64-2 is less than the value of $-V_R$ which in turn is equal to or less than the high threshold voltage of the memory transistor. Since $\phi_1$ is low, the address switch 62-1 and 62-2 become conductive. Since $\phi_2$ and $\phi_4$ potentials are repulsive, barriers are created on each side of the well 46-1. Also, since $\phi_3$ is attractive, the well 46-1 constitutes a signal charge receiving well. With respect to the first memory cell, the threshold value of the memory transistor 64-1 was shifted to the binary 0 or high state. As such, the voltage $-V_R$ is insufficient to create a channel for charge to flow from the source of the memory cell 64-1 to the receiving well 46-1 through the diffused region 60-1 so that a binary 0 state is read out of the particular cell. As for the second memory cell, the threshold voltage of the memory transistor 64-2 remained in its low or binary 1 state. Now the application of $-V_R$ easily enables a channel in the memory transistor 64-2 to transfer charge to the well 46-2 so that a binary 1 state is read out of the cell. Note that the $\phi_2$ and $\phi_4$ barrier potentials make the injection of a binary 1 self limiting since no charge can spill into adjacent bit locations. The latter statement however does not hold for a two phase drive system such as shown in FIG. 1, since the two phase barriers (made by either stepped oxide or ion implantation) are less effective than barriers created in the four phase system.

It should be noted that the READ operation of the memory cell according to the subject invention does not result in an inversion of the data originally clocked-in for non-volatile storage. Furthermore, since the READ operation does not affect the memory region threshold, the READ operation is non-destructive and can be repeated many times. The WRITE operation is non-destructive also since the address switch is controlled by a non-destructive sensing diffusion. Thus resuming the application of the clock voltages $\phi_1$, $\phi_2$, etc., immediately after a writing operation will read out the data that was previously memorized.

Thus what has been shown and described is a functional memory cell comprised of an MNOS memory controlled gated source in series with a CCD controlled MOSFET switch all in parallel with a CCD shift register stage, thereby providing non-volatile storage outside of the CCD shift register as opposed to storage inside the shift register.

Although the present invention has been described with a certain degree of particularity, it should be understood that the present disclosure has been made by way of example only and that numerous changes in the details of the circuitry in combination or arrangement of elements may be resorted to without departing from the scope and spirit of the invention.

We claim as our invention:

1. A functional non-volatile memory cell, comprising in combination:

a stage of a charge coupled device shift register having at least two potential wells capable of holding minority carriers, and a respective adjacent barrier to the flow of minority carriers and having means for applying bias potentials to said wells for selectively moving and holding said minority carriers;

first and second means respectively coupled to said at least two wells, said means being adapted to selectively sense the surface potential in the respective wells as well as inject charge therein;

a semiconductor address switch device external to said charge coupled device shift register and having a control electrode and two charge transfer electrodes;

a semiconductor memory device external to said charge coupled device shift register and having a reversible electrically-shiftable conduction threshold, a control electrode and two charge transfer electrodes, and being connected in series with said switch device by means of a respective charge transfer electrode, with both devices being coupled in parallel with said at least two wells of said charge coupled device shift register such that said control electrode of said switch device is coupled to said first means and the other charge transfer electrode of said memory device is coupled to said second means; and means for applying predetermined bias potentials to the other charge transfer electrode of said switch device and to the substrate and control electrode of said memory device during selective WRITE/READ modes of operation for selectively setting the threshold level of said memory device during the WRITE mode and effecting the charge transfer therefrom to one of said two wells of said shift register stage during the READ mode.

2. The memory cells as defined by claim 1 wherein said semiconductor address switch device comprises a field effect transistor switch and said semiconductor memory device comprises a metal-nitride-oxide-semiconductor transistor, each having a gate, a drain and a source, and wherein the series connection between the two transistors consists in the direct connection of the source of one transistor to the drain of the other transistor.

3. The memory cell as defined by claim 2 wherein said field effect transistor comprises a metal-oxide-semiconductor field effect transistor.

4. The memory cell as defined by claim 1 wherein said first and second means each comprises a diffused semiconductor sense region proximate to the respective well in said charge coupled device shift register.

5. The memory cell as defined by claim 1 wherein said charge coupled device shift register stage includes four potential wells adapted to have separate synchronized clock bias potentials applied for providing two alternately located receiving wells and two barriers to the flow of minority carriers.

6. The memory cell as defined by claim 5 wherein the alternately located receiving wells comprises the first and third wells and the two wells acting as barriers comprises the second and fourth wells.

7. The memory cell as defined by claim 6 wherein said first means is coupled to said first well and said second means is coupled to said third well.

8. The memory cell as defined by claim 7 wherein said semiconductor address switch device comprises a field effect transistor and said semiconductor memory device comprises a metal-nitride-oxide-semiconductor transistor, each having a gate, a drain and a source and wherein the series connection between the field effect transistor and the metal-nitride-oxide-semiconductor transistor consists in the direct connection of the source of the metal-nitride-oxide-semiconductor memory transistor to the drain of the field effect switch transistor.

9. The memory cell as defined by claim 8 wherein said field effect transistor comprises a metal-oxide-semiconductor field effect transistor.

10. The memory cell as defined by claim 9 wherein the gate of the field effect transistor is connected to said first means, said drain of the metal-nitride-oxide-semiconductor transistor is connected to said second means, the source of said field effect transistor is connected to a first bias potential line, and said gate of the metal-nitride-oxide-semiconductor transistor is connected to the second bias potential line, and wherein the substrate of said metal-nitride-oxide-semiconductor transistor is connected to a third bias potential line.

11. The memory cell as defined by claim 10 wherein said first and second means each comprises a surface potential sense region.

12. The memory cell as defined by claim 11 wherein said sense region comprises a diffused sense region located within the respective well.

* * * * *